US006499892B2

(12) United States Patent
Beggiao

(10) Patent No.: US 6,499,892 B2
(45) Date of Patent: Dec. 31, 2002

(54) PROCESSING OF PHOTOGRAPHS IN A PHOTOGRAPHIC LABORATORY BY OPERATORS

(75) Inventor: Vanni Leopoldo Beggiao, Padua (IT)

(73) Assignee: Systel International S.p.A. (IT)

( * ) Notice: Subject to any disclaimer, the term of this patent is extended or adjusted under 35 U.S.C. 154(b) by 0 days.

(21) Appl. No.: 09/776,305

(22) Filed: Feb. 3, 2001

(65) Prior Publication Data

US 2001/0048819 A1 Dec. 6, 2001

(30) Foreign Application Priority Data

Feb. 3, 2000 (EP) ............................................ 00102414
Apr. 7, 2000 (EP) ............................................ 00107133

(51) Int. Cl.[7] ............................ G03D 9/00; G06F 17/60
(52) U.S. Cl. ............................................ 396/564; 705/8
(58) Field of Search ...................... 396/564; 355/27–29, 355/77, 40, 41; 358/1, 15; 705/8, 10, 28

(56) References Cited

U.S. PATENT DOCUMENTS 5,159,385 A 10/1992 Imamura et al. .............. 355/28
5,798,820 A 8/1998 Kraft et al. ................... 355/40
2001/0019422 A1 * 9/2001 Hara ......................... 358/1.15

FOREIGN PATENT DOCUMENTS

DE 35 27 584 A 2/1997 ........... B65D/73/00

* cited by examiner

*Primary Examiner*—D Rutledge
(74) *Attorney, Agent, or Firm*—Peter F. Corless; Steven M. Jensen; Edwards & Angell, LLP

(57) ABSTRACT

Method of processing photographs in a photographic laboratory by means of a photographic processing system, comprising the steps of: receiving customer orders and processing information, respectively assigned to the customer orders, each order comprising at least one photographic image and each processing information defining processing tasks, wherein a number of processing tasks is assigned to at least one processing site based on the processing skills of a number of operators available at the processing site, and if particular processing information of said received processing information, which is assigned to a corresponding order, requires the execution of at least one of said assigned processing tasks, the corresponding order is processed at the at least one assigned processing site for said execution.

17 Claims, 5 Drawing Sheets

PROCESSING OF PHOTOGRAPHS IN A PHOTOGRAPHIC LABORATORY BY OPERATORS

CROSS REFERENCE TO RELATED APPLICATIONS

This application claims the benefit of the European patent application No. 00 102 414.0, filed Feb. 3, 2000, and entitled "Photo lab with automatic routing to automates and different level operators". The disclosure of this application is included in the present patent application by reference.

FIELD OF THE INVENTION

The present invention relates to the processing of photographs in a photographic laboratory. The present invention further relates to a processing system in a photographic laboratory for processing the photographs as well as to a program and a computer program product in accordance with the method.

BACKGROUND OF THE INVENTION

Conventionally, a photographer photographs pictures (images) by means of a camera. In this way he captures image information and stores the image information on a suitable storing medium, e.g. on a film in conventional cameras or on a digital memory device (e.g. floppy disk) in digital cameras. The photographer then brings the storage medium (e.g. film) to a photo shop (peripheral organisation). At a photo shop the storing mediums (e.g. films in film cartridges, electronic memory units of digital cameras, etc.) of several customers are collected and processing information are added concerning the particular processing wishes of the customers (e.g. the format of the photographic prints, type of photographic paper, number of prints per picture (image), adding of a CD with digitalised pictures etc.). Furthermore, the name of the customer is noted and usually an individual order number is assigned to a so-called order or customer order which comprises, for example, a work envelope with an inserted film cartridge and the working instructions or processing information. Moreover the photo shop may add particular requests to the processing information, e.g. the request to add one or more particular promotions to the work envelope at the photographic laboratory. In this way, a plurality of "customer orders" are collected at end of the photo shops.

A plurality of photo shops exist, each of which collect a plurality of customer orders. Each photo shop forwards the customer orders to a photographic laboratory (centralised organisation). At this photographic laboratory, each order is processed by processing the customer order (e.g. film) of the order according to the processing information (e.g. notes, bar codes, etc.) of the order. For instance, in the prior art (see EP 0 952 487), a photographic laboratory executes the following processes on a customer order:

- receiving the customer order comprising e.g. the work envelope of the photo shop and the film cartridge within the work envelope, and processing information, said order including e.g. notes which describe the processes to be performed with the film negatives of the customer order, transport and customer address etc.;
- removing the film cartridge from the work envelope;
- pulling the exposed film out of its enclosure in the cartridge;
- marking the work envelope and the exposed film by a suitable work code (e.g. bar code or the like);

- joining together the films of different customer orders thus marked to provide a film negative batch;
- developing the batch of films which have been joined together, thus obtaining batch of negatives, wherein different portions of said batch belong to different customer orders and thus to different processing information;
- printing the successive photographs disposed in the batch on a web of photographic paper, different portions of said batch belonging to different customer orders;
- distinguishing between the prints of each customer order by applying a work code (e.g. bar code) to the prints, which refers to the corresponding negatives;
- cutting the negatives of each customer order into film sections, those film sections including a number of images, according to the number of photographs determined in the processing information belonging to the same customer order;
- cutting the prints of each customer order, one by one, from the web of prints and stacking them so as to form the stack of prints associated with this customer order;
- inserting sections of negatives and the stack of prints assigned to the same customer order into an appropriate flexible pocket-type envelope (a wallet);
- adding any supplements like promotion coupons, mini-albums, floppy disks, CDs etc., assigned to the customer order, to the pocket-type envelope or wallet assigned to the same customer order;
- closing the pocket-type envelope and placing it in the work envelope (assigned to the same customer order;
- closing the work envelope and applying a price label which corresponds to the customer order treated;
- sending the work envelope and thus the processed customer order back to the shop from which it was dispatched, for delivery to the customer.

All above-mentioned processes represent examples of processes on customer orders within the scope of the present invention. The above processes may be performed automatically by processing devices or semi-automatically with the assistance of operators or manually by operators.

A photographic laboratory, in general, serves a wide area with a large number of photo shops and, therefore, must be fitted out for processing (handling) a large number of orders (up to ten thousands various orders a day). This has been made possible only by a high degree of automation in the laboratory itself, with a consistent necessity to standardise the components used (print format, envelopes etc.). A drawback of this standardisation is that individual wishes or information of the customer may not be fulfilled. On the other hand, if a photographic laboratory is designed to fulfil a variety of wishes of a customer, i.e. a variety of processing information, the photographic laboratory must have a huge number of different processing devices which have to perform the individual orders automatically. Since, however, some individual orders are only rarely desired, the particular processing devices assigned to performing the processes according to those individual wishes or instructions, are only rarely used and therefore not profitable. Furthermore the individual wishes of customers can change due to a change of fashion.

In view of this, and in accordance with the present invention, operators process the customer orders in a photographic laboratory at least partly. The operators are integrated in the processing system of the present invention and may use devices for said processing which belong to the processing system. Additional processing work may be done by automatic processing devices which are also part of the processing system.

The operators in a photographic laboratory usually have different skills. A drawback of the photographic laboratories of the prior art is that the skills of the operators are not optimally used and/or developed.

SUMMARY OF THE INVENTION

It is an object of the invention to provide a method for processing photographs which allows for an optimised use of the skills of operators. Furthermore, a corresponding processing system, program and computer program product should be provided.

The object of the present invention is solved by the subject matter of the claim 1, claim 13, claim 15, and claim 16. Advantageous embodiments are presented in the dependent claims.

According to the present invention, customer orders, e.g. film cartridges with a film therein, are received in a processing system provided at the photographic laboratory. As mentioned above, the operators represent an integral part of said processing system. Such a processing system may further comprise a plurality of processing devices in particular also instead of the operators. For instance, a processing device may be a splicer for splicing together films to provide film batches, a printer for printing photographs on photographic paper, a developer for developing photographic film, a cutter for cutting a film web or print web, a packing device for packing items, e.g. prints into a wallet or work envelope, a work station or computer which receives digital photographic data together with the processing information via a network, e.g. LAN or internet. The processing system may further comprise a conveying means, in particular a conveying belt, on which pallets are conveyed. The processing system may comprise supplement supplying means which, for example, supply supplements like CDs, mini-albums etc. to a pallet on a conveyer. The processing system may comprise work stations for digitally processing the photographic data, laser printers for printing the photographic data or work stations for transmitting the processed photographic data to a photo shop and so on. In case, the photographic data are received via network, the photographic order may be a block of digital data including the digital image data representing the customer order and a digital header to the digital image data representing the processing information.

A customer order consists e.g. of a film cartridge and an assigned processing information. The processing information defines in which way the film cartridge is to be processed. As stated above, the film is related to a work envelope and a film cartridge at the beginning of processing. During processing, the condition of the customer order is changing, the film is developed and prints are added to the customer order. Furthermore, other elements (supplements) may be added to the customer order, like CDs or wallets etc.

The processing system of the present invention can perform all kinds of processing usually performed at a photographic laboratory or can perform only a part of this according to the present invention. In particular, the processing system can comprise all kinds of processing devices or processing sites equipped with devices for semi-automatic processing, starting from the unpacking of a work envelope received in a photo laboratory and reading the processing instructions attached to the working envelope, to packing the finally processed customer order into a package. The processing system of the present invention may also be restricted to a part of the process. In particular, the processing system may be restricted to the cutting of print webs and film webs and the sorting and final packaging of the developed film and the prints. If the processing system of the present invention is, for example, restricted to this part of the process, the customer orders are, for example, received in the form of print webs and film webs. Furthermore, the processing information or instructions are already digitalised and received in a digital controller (computer) of the processing system. This digital controller may be a work station or a computer which controls the processing devices of the processing system.

It is preferred to assign match codes, e.g. bar codes, to the elements of a customer order, i.e. the film section, the print section, the envelope, and/or the like before or just after entering one or each of the processing devices of the processing system according to the invention. This can be done to be able to assign the elements of a customer order to each other with respect to particular processing devices. The matching operation itself can be accomplished by a centralised computer which coordinates the processing of each of the customer orders in compliance with the respective assigned processing information, e.g. instructions imposed by the customer and/or the photo shop.

Usually the processing of customer orders is organised in a sequence of processing steps. In order to control the processing, the controller may, for instance, monitor at which processing step each customer order is present. If, for example, the customer order comprises digitalised photographic data or image data, the controlling of the processing of the digital data is performed by incorporating the photographic processing program into an overall controlling program. If the customer order comprises conventional films and prints and if thus the customer orders are processed physically and not digitally, usually marks (work codes) are provided on the physical elements of the customer orders, i.e. by providing marks (e.g. bar code) on the margin of the prints (web of prints) or film. These marks are read by detectors or operators in order to monitor the location of the customer orders (prints, film section) within the processing system and/or in order to control the processing as well as for instance the progress of one or several orders during the process flow.

The controlling means of the processing system may be organised centrally or decentrally. If the controlling means is organised centrally, it is preferred to identify a customer order and its location in the processing sequence and to transmit this information to the central processing means. Based on this information, the controlling means controls the processing devices or processing sites of the processing system in order to execute the next processing step on the particular customer order in accordance with the processing information assigned to the customer order. Preferably, there are memory means where the processing information is stored, said memory means being accessed by the controlling means. The control of processing sites staffed with operators may be performed via displays on which the instructions for the operator are displayed, which describe the processing task to be performed by the operator on the customer order just present at the related processing site.

If the controlling means is organised decentrally, preferably, each processing device and/or processing site of the processing system has its own controller. This controller checks the marks on the customer order (e.g. web of prints) which the processing device has to process. In this case, the marks additionally comprise instructions which are read by the controller of the processing device or by the operator at the processing site. The controller of the processing device then controls the processing device in order to perform the instructions or the controller of a processing site gives instruction e.g. via a screen to operators located at processing sites. For instance, the instructions may describe the format into which the web of prints has to be cut, i.e. the format of each single print. Finally, a central controller may cooperate and communicate with decentral controllers.

According to the present invention, processing tasks are assigned to processing sites. Preferably, this assignment is based on the capabilities or features of the processing sites, e.g. available work space, available equipment. The processing sites are staffed with a number of operators of certain skills. Preferably, the assignment is additionally or alternatively based on the skill of the operator(s) which is/are available at a particular processing site. Thus, the assignment is based on the machines and devices available at a processing site and/or the skills of the operator at the processing site, i.e. whether the operator can handle the different devices at the processing site or not. For instance, the assignment can be based (additionally) on the quality of which the operator performs different processing tasks or on the experience of the operator. Preferably, a controlling means of the processing system analyses the processing orders in order to determine which processing sites are suitable for the required process. If different processing tasks are to be performed at different processing sites, the controlling means, preferably, determines the sequence of the processes at the different processing sites and in particular controls the passing of the customer order from one processing site to the next one according to said sequence.

The processing system of the present invention preferably comprises a controlling means and a memory. The different processing skills of the operators and processing features of the processing sites are stored in the memory and the controller accesses the memory in order to determine which one of the processing sites can perform the processing task. The customer order is then passed to the processing site assigned to the processing task to be performed.

If the customer order comprises e.g. prints or envelopes as elements, the elements are passed to a processing site by a conveying means. If the film cartridge is present as digital data, the digital data are transmitted via a network to the processing site for further processing.

Preferably, the different processing sites are organised and ordered into difficulty levels in order to optimally use the different skills of the operators. Depending on the skills of an operator at a processing site, different processing tasks may be performed at the processing site. For instance, a highly skilled operator may produce particular prints representing enlargements of portions of negatives or may digitally process the photographic data in order to produce particular prints. Additionally such a highly skilled operator can be able to cut prints into particular formats or to pack prints into envelops. A medium skilled operator may be able to cut the prints and to pack prints into an envelope. And a low skilled operator may only be able to pack the prints into an envelope. The higher the skill of an operator the higher the difficulty level of the processing tasks which may be assigned to the operator.

Preferably, the controlling means controls the passing of the customer orders and the processing of them such that the customer orders are passed to those processing sites to which a sufficient difficulty level is assigned. Preferably, the controlling means passes the customer order to be processed to that processing site having the lowest difficulty level which is sufficient to perform the processing tasks. In this way the working time of highly skilled operators can be reserved for the difficult tasks.

If processing information contains an instruction which represents new or unknown processing tasks, preferably, the corresponding customer order is directly passed to a processing site with the highest difficulty or skill level.

It may be defined that only operators of a particular skill have access to certain processing sites. In this way a certain difficulty level may be guaranteed for a particular processing site. Alternatively or additionally, it is monitored which operator is available at which processing site. This may be performed by requesting the operator that he logs into a network connected with the controlling means of the processing system of the present invention. The controlling means then assigns, based on the stored processing skills of the operator and the available processing features and capabilities of the devices at the processing site, a particular difficulty level or skill level to the processing site.

Advantageously, there is provided a number of, or a plurality of, processing sites, wherein each processing site is assigned to a number of particular processing tasks. Preferably, the controlling means decides which one of the processing sites is best suitable to perform the processing tasks (instructions). Advantageously, for this purpose, an allocation table is stored in the memory means. This allocation table locates processing tasks (to the performed instructions) to different processing sites. If an instruction defines a particular processing task, the controlling means accesses the allocation table and decides based on the allocation table to which the corresponding customer order or element thereof should be passed. The term "passing" may mean "conveying" if physical elements like prints are concerned, or "transmitting" if digital data like image data are concerned.

As mentioned above, different levels of difficulty may be assigned to at least some of the different processing sites, each processing site of a particular level of difficulty may process processing tasks of the same or lower difficulty level. In this way, an optimum usage of the available processing sites and the skills of the operators at those processing sites is possible. Preferably, a customer order to be processed at a processing site is conveyed to that processing site having the lowest possible difficulty level which is still able to execute the required instructions.

Additionally or alternatively the processing tasks may be categorised in categories based on the kind of processing to be performed, e.g. cutting, packing, image processing etc. A category is assigned to a processing site. The controlling means ascertains to which category the different processing tasks defined by processing information and/or instructions belong and passes the corresponding customer order to the suitable processing site. The allocation of a category to processing tasks and to processing sites may be stored in a memory accessible by the controlling means. The categorisation of processing tasks promotes the modular structure of the processing system of the present invention and may also be applied to automatic processing devices by assigning a category to an automatic processing site. In particular automatic processing devices and semi-automatic processing sites belonging to the same category (e.g. packing) may be locally grouped in order to reduce the transportation distances of the customer orders and to facilitate replacement of processing sites by automatic processing devices, the replacement of automatic processing devices and/or the update of control programs for the processing devices.

Preferably, the processing system of the present invention is also used for quality control and quality management. For example, detectors (e.g. cameras) may monitor whether the elements of a customer order are properly processed. For instance, it may be monitored whether the quality of the cutting of prints or the quality of packing the prints in an envelope is sufficient. If an error or unacceptable quality is detected, the corresponding customer order may be identified by the controlling means and conveyed to an appropriate processing site, e.g. staffed with a quality expert, which may handle the error or quality defect.

It is a major advantage of the processing system of the present invention that it also accepts customer orders with processing information and/or instructions which also define instructions which can automatically be processed by an automatic processing device of the processing system, i.e. not at a processing site and without assistance of an operator. The present invention allows for a continuous processing of the customer orders, even if some of the instructions of the processing information can automatically be processed and some can be processed with the assistance of an operator or even both.

The advantage is accomplished by checking each processing information to ascertain whether or not the processing information or instructions can automatically be processed by the processing system. Checking may be performed by the controlling means of the processing system. In this application, the term "automatically processing" means that a customer order may be processed without the assistance of an operator, i.e. automatically by a processing device. An example of "automatically processing" is packing prints automatically into an envelope by a packing machine without the help of an operator or cutting the prints by an automatic cutting machine and not manually by means of an operator. Thus, automatically processing is performed by the processing system (e.g. by a device or machine of the processing system) without the assistance of an operator.

Preferably checking of the processing orders is performed by analysing the instructions enclosed or included in the processing information and the processing tasks they imply, as stated in further detail later on.

Since, according to the present invention, the processing information and/or instructions are assigned to their corresponding customer orders, based on said checking, it is possible to identify those customer orders in the processing system which are to be processed according to processing information which is automatically processable and partly automatically processable, or processable at a processing site by an operator. If the customer order may be processed both automatically and at a processing site, the controlling means, preferably, determines the way of processing. Advantageously a customer order is processed automatically, if an automatic processing is possible. For this purpose processing information is preferably analysed in order to identify customer orders which may be processed automatically, the remaining units are thus identified to be processed non-automatically.

For instance, at least one of the following processes or treatments may be performed if a non-automatically processable unit has been identified:

a warning signal may be issued which identifies the customer order. In this way the customer order may be separated from the processing line and further processed by means of an operator at a processing site;

the customer order may be automatically separated and conveyed to a processing site where it is semi-automatically or manually processed;

a label may be attached to the customer order and/or a pallet which supports the parts of the customer order which describes the instruction to be performed semi-automatically or manually, and which in particular can also include information, to identify the relation of the customer order to a photo shop, a customer and/or the like.

In summary, the checking of the processing information for automatically processability and the identification of the non-automatically processable units allow for an integration of the automatic processing of customer orders in the semi-automatically or manually processing of those units.

A particular advantage of the present invention is that the automatically processing capabilities may be used as far as possible or appropriate in those cases in which at least one instruction of the processing information is automatically processable.

If, for example, the processing information comprises automatically processable instructions concerning the formats of the prints and thus the cutting of the web of prints, but also comprises particular instructions concerning the addition of supplements to customer orders, a huge part of the information may be accomplished automatically. The prints may be processed and cut in the desired formats, the cut prints and the corresponding section of film may be supplied to a pallet assigned to the information and conveyed on a conveyer. Furthermore, a supplement may be added to another tray or compartment of the pallet. However, if the pallet arrives at the packing machine (which is also part of the processing system), the packing machine is not able to pack the supplement automatically in an envelope. The processing system of the present invention solves this problem since the processing system checks the processing information and recognises that the adding of a supplement results in that the packing machine is not capable of automatically packing all parts of the customer order into an envelope. The processing system identifies the customer order which comprises for instance at this stage of processing a pallet, the prints, the film section and the supplement. This identification allows for a different treatment of the identified customer order. For instance, the identified pallet may be conveyed to a packing site where the film, the prints and the supplement are packed into a suitable envelope by an operator. After packing the package (wallet and/or envelope), the package is refeed to the automatic processing line which conveys the packages to a shipping station. Furthermore, the (empty) pallet is separated from the customer order and refeed to a conveyor belt for reuse in the processing system, i.e. the pallet may be refilled by other prints, films and supplements of a different customer order. A processing system of the present invention may comprise a processing line, where a number of processes is performed on the customer order in a sequence. The "automatic part" of said processing line, i.e. the automatic processing line, comprises devices which automatically process the customer order.

In a very simple case, according to the invention all orders which cannot be handled automatically could be directed to one storing position to wait there the e finished. Accordingly, in correspondence with a processing information, a conveyer could transport the parts of a customer order to said storing position to be treated in a manner which would not be possible automatically. For instance, said orders could be collected to be finished once a day by an operator or several operators of different skills.

For checking the instructions of an order, to ascertain whether the instructions are automatically processable or not by the processing system, the controlling means of the processing system preferably accesses a memory means. A list of processable instructions and/or sequences of processable instructions is preferably stored in the memory means. The controlling means compares the instructions of processing information with the stored instructions or sequences of instructions. Based on this, the controlling means decides and assesses whether the processing information is automatically processable or not. Furthermore the controlling means advantageously decides which instructions of the processing information should be performed automatically and at which stage of the processing the corresponding customer order should be separated from that portion or those portions of a processing line assigned to the automatic processing, and which should be semi-automatically or manually processed.

Advantageously, the method of the present invention for processing customer orders according to their corresponding processing information is performed by means of or with the assistance of a program which runs on a computer, work station etc., which controls the processing system.

The present invention further relates to a computer program product, like a storing medium for storing a computer program, which stores the above-mentioned program. A storing medium may be a CD, a DVD, a hard-disk, a floppy disk etc. The present invention also covers the provision of the program via internet.

BRIEF DESCRIPTION OF THE DRAWINGS

In the following, preferred embodiments of the present invention are described. Particular features of the different embodiments may be combined.

DETAILED DESCRIPTION OF THE PREFERRED EMBODIMENTS

Figure 1:
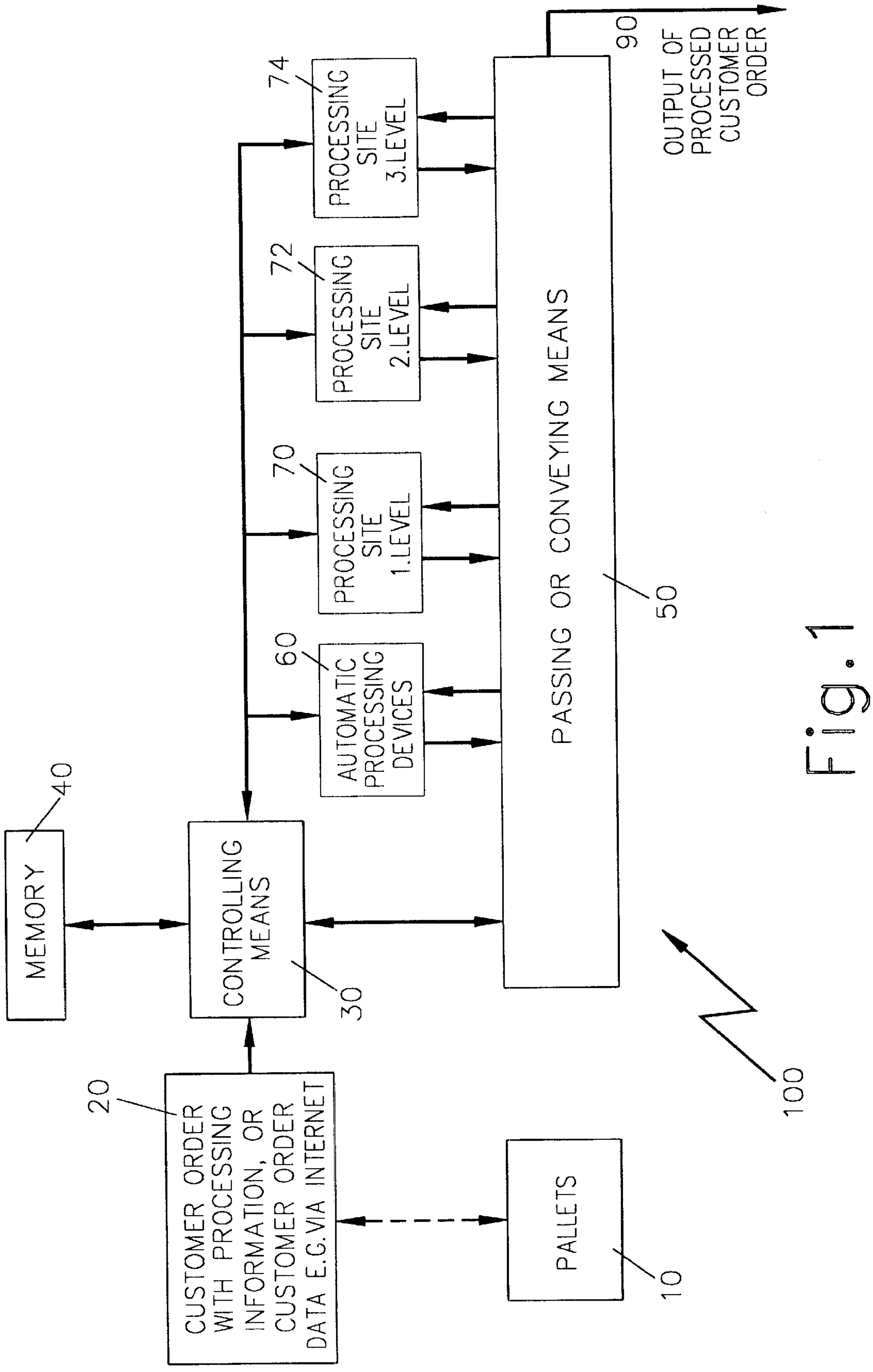
FIG. 1 is a schematic diagram of a processing system according to the present invention.

As shown in FIG. 1, orders 20 are supplied to a processing system 100 said orders being assigned to customer order 10. Processing information dedicated to one assigned order describes in which way the order has to be processed by the processing system 100.

In the system, elements of a customer order which are processed are directed to pallets 10. These pallets 10 can be recognised on the basis of some marks, e.g. a bar code and thus one particular pallet can be related with one particular customer order 20. During processing of said particular customer order 20 in accordance with the processing information, the movement as well as the progress of this customer order can be monitored on the basis of the marks which are assigned to said particular pallet 10.

The processing system 100 comprises controlling means 30, a memory 40, automatically processing devices 60, processing sites 70, 72, and 74, and passing or conveying means 50.

The customer orders 10 can be in a partially processed state when they enter the processing system at the input. Furthermore the customer order can already be completely processed when they leave the processing system 100 at the output 90, however an incomplete processing by the processing system is also within the scope of the present application.

Figure 2:
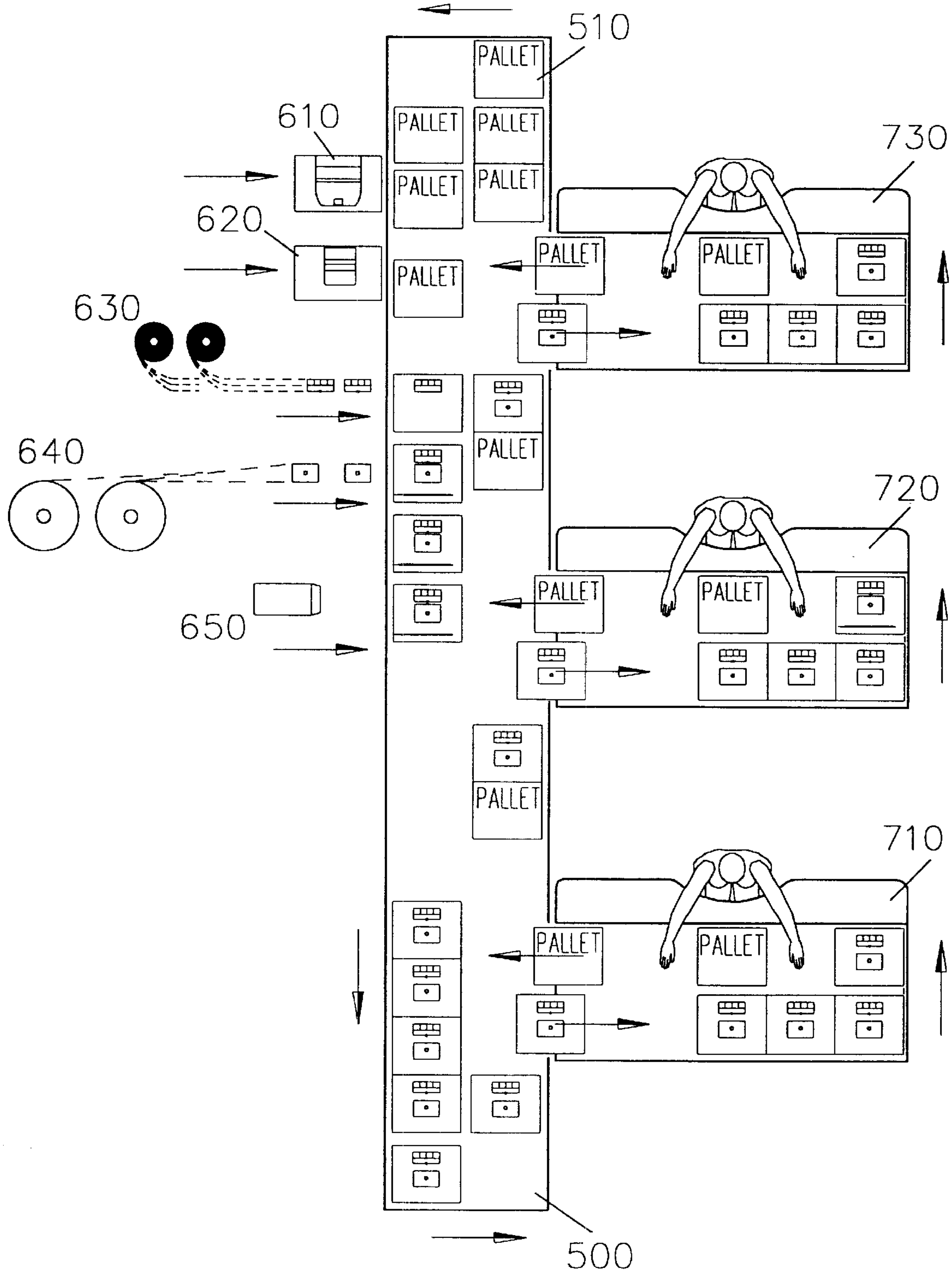
FIG. 2 is a schematic diagram of a processing system according to the present invention.

The order which enters the processing system at the input may be, for example, in the form of a working envelope comprising a film cartridge. If the related customer order is already partially processed, the customer order may comprise separate elements when entering the processing system 100. For instance, the customer order may consist of a sequence of prints on a web of prints and a sequence of negative images (pictures) incorporated in a film web. FIG. 2, which will be discussed below, pertains to the case when a film web and a print web enter the processing system.

The processing information may simply be input in the processing system at an input of the controlling means by means of an operator, who reads the information and inputs them using a keyboard and an input assisting application program into a computer linked with the processing system. Alternatively, automatic reading of processing sheets or labels may be used. If the processing system relates to processing of already partially processed customer orders, preferably, the information is are already digitalised and provided to the controlling means. A further alternative or additional option is that for example the customer orders comprise marks (bar codes) which are read by detectors, sensors or the like. These marks represent the processing information or instructions which are read by the detectors in order to supply them to the controlling means, i.e. to the central controlling means 30 and/or to controlling means of the individual automatic processing devices 60 and/or to the semi-automatic processing sites 70. At the processing sites 70, 72, and 74 the current processing information to be processed by an operator on the current order, i.e. the related customer order may be displayed on a screen.

In front of or in each of said devices 60, it is preferred to provide the elements of each of said customer orders with a particular matching code. The actual place where an element of a customer order is present can be monitored, and the elements of a customer order, e.g. the assigned film portion (s), print portion(s), envelope and the like, can be assigned to each other. Also each pallet 10 assigned to one particular customer order should be provided with such a match code or the like to monitor and control the processing of the assigned customer orders in progress and the elements assigned to those customer orders. A central control device, e.g. a computer and/or a server can control the matching operations and can assign the processing information to the particular customer orders and/or the particular processing devices 60 of the overall system 100, preferably in accordance with the assigned matching codes related to the corresponding customer order and/or its elements.

Finally the processing information and the image data may be received entirely digitally, e.g. via internet. In this case, an order may consist of a customer order representing the digitalised image (picture) data and a header representing the processing information and/or instructions.

When the customer orders are received in the processing system, they are conveyed by means of a conveying means (e.g. endless belt). The conveying means, for example, conveys the customer order (e.g. a print web and a film web) to automatic processing devices (e. g. a cutter for the film web and a cutter for the print web). The automatic processing devices perform instructions on the print unit (film web, print web). For instance, the film web and the print web are cut into formats according to the instructions. The instructions are provided either centrally by the control means which monitors the location of the customer order and/or by detecting the marks on the margin of the print web or film web.

If the order comprising digital image data, an automatic processing device may be an image processing device which analyses the images, performs colour corrections and/or prints the images, e.g. by means of a laser printer, a digital micro mirror device or the like.

According to one embodiment of the present invention, automatic processed elements of a customer order are fed to pallets which are conveyed by the conveying means. Other automatic processing devices (dispenser) supplement additional items to a customer order, e.g. wallets, envelopes or CDs.

According to one embodiment of the present invention, a memory 40 stores instructions which are automatically processable by the automatically processing devices. The controlling means 30 checks by accessing the memory 40 whether the instructions of a particular order are automatically processable. If some of the instructions are not automatically processable, the corresponding customer order is fed via the conveying means to a suitable one of the processing sites 70, 72 and 74.

If, for example, an automatic processing device is a device for packing the different elements of a customer order into an envelope and/or wallet and the standard envelope is too small for items to be packed in the envelope, the controlling means conveys the elements of the customer order to a processing site (semi-automatic processing site or manual processing site) where the elements are packed by an operator into a larger envelope. The larger envelope is then conveyed back to the conveying means 40 in order to convey the envelope further for shipping.

If, for example, the customer orders are received as digital data, a particular non-automatically processable instruction may be to combine different, separate pictures to one large panoramic picture. In this case the image data are passed (transmitted) to a semi-automatic processing site where an operator performs the combining on a work station by means of an application program and a computer. The operator is particularly skilled for performing the combination of the different pictures to one large panoramic picture. Afterwards, the processed data package representing the enlarged panoramic picture is passed (transmitted) back to the passing means 50. For instance, the passing means (transmitting means) 50 then passes (transmits) the corresponding data package to an automatic processing device 60, e.g. a laser printer, where the enlarged panoramic picture is printed.

In summary, the passing or conveying means 50 shown in FIG. 1 may be a conveying means for conveying physically customer orders, like prints or envelopes, or may comprise both kinds of passing means.

A particular advantage of the present invention is that the processing system has a flexible design, i.e. modules may be added to the processing system or removed in a flexible way. It is only necessary to update the memory about the instructions which may be performed automatically and about the capabilities of the different automatic processing devices 60 and semi-automatic processing sites 70, 72, 74. If, for example, a new processing device is added to the processing system which may, for example, produce CDs based on image data of a photographic order, this new device may be integrated into the new processing system 100, while the controlling program stored in the memory 40 may be simply updated in view of the new processing device.

In order to pass a customer order to a suitable one of the processing sites 70, 72, 74, the controlling means 30 checks the processing order for the difficulty or skill levels. For this purpose the controlling means accesses the memory where, e.g. by means of an allocation table, different difficulty levels are assigned to the processing sites 70, 72, 74 and different processing tasks are allocated to different difficulty levels. The allocation tables may be updated depending on the machines and devices available at the processing site as well as on the operator and the skills available at the processing site. This updating may be performed via network communication between the controlling means and the processing site or processing device.

The controlling means controls the passing or conveying means 15 to convey or pass the customer order to the suitable one of the processing site 70 assigned to the first difficulty skill level, the processing site 72 assigned to the second difficulty or skill level, or to the processing site 74 assigned to the third difficulty or skill level. If, for instance, processing tasks of different difficulty levels are to be performed according to processing information, the conveying means conveys the corresponding customer order to the suitable processing sites in a sequence.

A processing system according to the present invention may comprise, for instance, a standard HS print line, a print dual batch loader, a standard HS film line, a film dual batch loader, an index print feeder, a poly feeder, a dispenser for CDs, mini-albums, advertisement materials and various other items.

A print dual batch loader and also a film dual batch loader, as referred to above are each a system for supplying the print or film web to a corresponding cutter in a continuous way. This device gives the possibility to load two rolls of prints or film. If the first roll is finished, the trailing edge of the first is automatically spliced to the leading edge of the second. The advantage is that the presence of the operator is not necessary in the precise moment when the first roll ends, he can load the next roll in any moment during the process of the previous roll. A roll can be an entire batch or part of a multi-roll batch.

A HS print line usually is a high speed print line which is composed of a print cutter which performs the following functions and steps. First the prints are cut and using the punch marks as a reference and contiguous orders are separated. Then the photographic order or customer order is identified by reading its matching code. The matching code is an information used by the system controlling software to match the prints with the rest of the order. The identification is done by decoding the positions left/right of the punch marks. Afterwards the format of every print is identified and the print belonging to the current order is identified and are counted by format. Furthermore, the quality marks for separation of reject/remake prints are recognised. A print sorter is operated to separate the prints, according to their print length (if more than one format is present in the order) and quality (quality marking). A print buffer provides the possibility to stack the prints output by the sorter in different levels, according to their format. About five different compartments are provided. In case of APS orders starting from the uppermost, the compartments are assigned to index prints, classic format prints, HDTV format prints, panorama formal prints and remake prints of any format.

The print buffer has a variable width being determined by controlling software to match to the print width. The compartments or lots have different lengths determined by bumpers which preferable are adjustable obstacles. These bumper devices or stoppers have the function to obtain a good alignment of prints, the ease the subsequent introduction into the wallet or envelope, manual or automatic.

The prints, when the cutting of the order is completed, are buffered at once. To obtain a correct dropping also of index prints, that may be longer than the classic format, the bumper of the classic format besides its normal position adjustment performed together with the other stoppers. Allows for a further movement, for instance a retraction, accomplished only when the print dropping is performed. A print handler is to align the prints laterally to remove the print stack from the buffer are, and to modify their orientation according to the needs of the next functional unit, e.g. the pallet interface or the automatic wallet packaging. These are the elements of the HS print line.

A HS or High Speed film line includes a film cutter, a film stacker and a film handler. The film cutter is to cut the film in film sections, and to separate contiguous orders; the photographic order are identified by reading it matching code, i.e. the information used by the system controlling software to match the film with the rest of the customer order; the identification is done by decoding a bar code or the like printed on the film splice portion.

The film stacker is to stack the film sections avoiding the contact between film section during the superimposition to suppress scratching of the film negatives. The width of film stacker is automatically adjusted, under the control of system software, according to the film type and the presence of a tab. The tab is a paper web applied to the side of the film. The automatic adjustment can also be realised on the basis of a reorder web paper web applied to the side of the film, the keep together film sections of a film already cut during a previous processing.

The film section, when the cutting of the order is completed, are buffered at once.

The film handler is placed to receive the entire film cut in sections from the stacker, and to modify it in orientation according to the needs of the next functional unit, e.g., the pallet interface or automatic wallet packaging.

Finally, a polyfeeder is a multi-way dispenser for advertising materials such as single sheets, folded sheets, booklets or other flat materials. The polyfeeder, under the control of system software, is able to collate a set of objects that may vary order by order according to data, e.g. said processing information, provided by the customer and/or the photo shop.

An example of a processing system is shown in FIG. 2. As automatic processing devices, the processing system comprises a wallet feeder 610 for large wallets and a wallet feeder 620 for small wallets. The wallets are meant to be filled with the cut prints and film. Furthermore provided as an automatically processing device is a cutter to cut a film web in suitable formats in accordance with the processing information related to a particular customer order. In addition a cutter 640 for a print map is provided as an automatically processing device, The film web and the print web represent a sequence received in the processing system shown in FIG. 2. Another automatically processing device is the envelope feeder 650.

On a conveying means 500, pallets 510 are transported, e.g. in a circular way.

A pallet 510 is preferably assigned to processing information dedicated to one particular customer order. Preferably, the pallet is marked, e.g. by a bar code or bar information stored in a rewritable memory installed in the pallet. In this way, the assignment of a pallet to an order can be controlled during conveyance of the pallet. The pallet is filled with a large wallet by the wallet feeder 610 or a small wallet by the wallet feeder 620, depending on the processing information to which the pallet is assigned. Thereafter, the section of the negative film web, which is assigned to the processing information, is supplied to the pallet. Subsequently the corresponding prints assigned to the same processing information are feed to the same pallet by the cutter 640. In a last step, a corresponding envelope 650 is feed into a tray or compartment of the pallet. At this stage, the pallet and all items in the pallet represent a finished customer order. If the controlling means assesses that the finished customer order can be processed by an automatic packing machine (not shown), the finished order may be conveyed to the packing machine. Otherwise, the pallet is conveyed to one of the semi-automatic processing sites 710, 720 or 730, where the different items in the pallets are packed by an operator. The operator may put back the packed finished customer order to the conveying means 500 for further conveyance to a location where the packages are prepared for shipping.

The pallets 510 are assigned to a particular processing information. After the pallet has been filled by different items, some processing instructions still have to be performed with the items and/or the pallet, in particular packing the items into the wallet or still performing some cutting tasks. The controlling means decides, based on the above-mentioned allocation table, which one of the processing sites 710, 720 and 730, e.g. the corresponding operator, has the appropriate difficulty level for the remaining processing tasks. When the controlling system has determined the appropriate processing site, the controlling system controls the conveying means 500 such that the corresponding pallet is conveyed to the processing site with the appropriate difficulty level. If processing tasks of another difficulty level remains to be executed, the customer order is conveyed to a next processing site of appropriate difficulty level.

It is also possible to convey all orders, which cannot be automatically processed to an intermediate storage at first, if the processing sites are inactive or no operators are present at the sited 710, 720, 730. When the sited are active later, all the orders collected in the intermediate storage can be send to the sited to be finished.

The processing system of the present invention particularly comprises a processing device with the following features, which processing device can be represented e.g. by the device corresponding to the reference number 640 in the FIGS. 2 to 5:

cutting means for cutting a portion of web of photographic prints belonging to one customer order into sections of different length, said sections representing photographic images and/or index prints, sorting means for sorting the sections in different compartments according to their lengths, said compartments being arranged one above the other, releasing means assigned to each compartment for releasing the sections of each compartment such that they fall due to gravity down onto a collecting means which collects the released sections ordered according to their length, wherein the uppermost compartment is provided for index prints which can have larger dimensions than the smaller prints, so that bumping means provided for stopping said small dimension prints have to be withdrawn, such that the index print or index prints can fall on top of the collected pile of prints when said index print is released.

Figure 3:
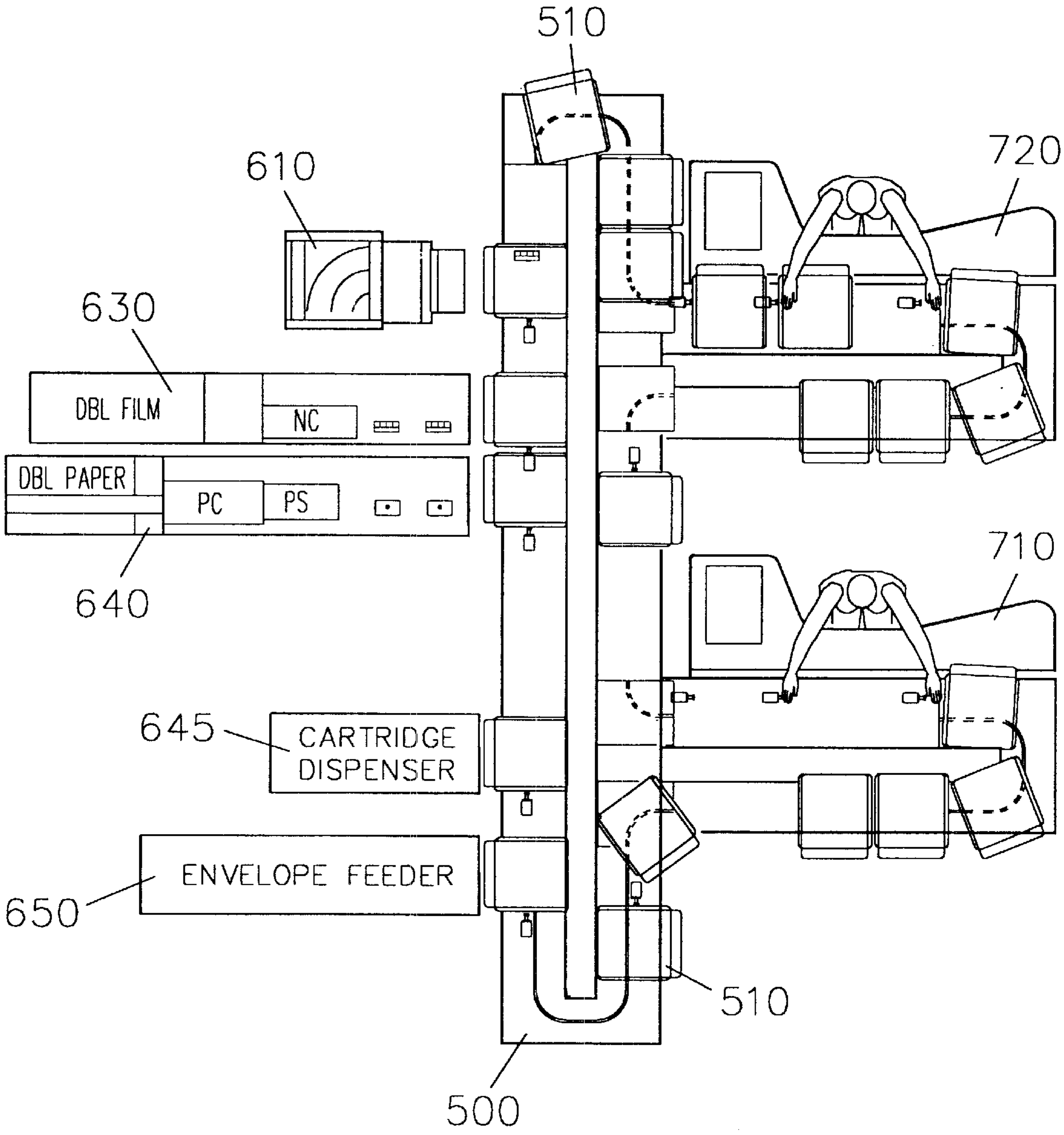
FIG. 3 is a schematic diagram of a further embodiment in accordance with the invention.

FIG. 3 shows a further schematic view of another embodiment of the invention. The same reference numbers concern the same parts or devices as in FIG. 2. The same applies to FIGS. 4 and 5. Accordingly, those parts or devices which are discussed with reference to FIG. 2 will not be described again with reference to FIGS. 3 to 5.

In FIG. 3, in addition to FIG. 2, a device 645 is available, which serves to supply different kinds of additional items, e.g. CDs, advertisement materials, index prints or similar.

The embodiment of FIG. 3 has a rather low level of automatisation and, accordingly, needs at least one operator 710 or 720 with very high level skills. On the other hand, this embodiment is very flexible, since the very well trained operator is also able to deal with customer orders which are very specific or unique .

The embodiment of FIG. 3 works such that a central computer organising the processing of a huge number or customer orders, identifies such a particular order and the identification code of a pallet 510. From the different devices 610, 630, . . . arranged along the conveyer path 500, in accordance with the identification code of this pallet, which code is in this stage also an identification code for a particular customer order, several items are assigned to this pallet in accordance with the processing information stored by the central computer or lab server which organises the process flow of the customer orders in the photo laboratory. It is also possible to add a further instruction paper with processing information for an operator informing the operator how to treat a specific customer order.

All the items located on the specified pallet 510 after the last device 650 are finally led to one of the operators 710, 720, . . .

Since the central computer has stored complexity information showing whether a specified customer order positioned on a particular pallet is more or less complicated to deal with, the central computer is able to guide a pallet with a more complicated customer order to an operator with high level skills, e.g. 710, and customer orders which are easy to handle to an operator with low level skills. In accordance with this complexity information, a corresponding switch or guide arrangement in the course of the conveyer device 500 can be activated to guide a corresponding pallet either to the operator 710 or the operator 720 (or another one if existent).

Figure 4:
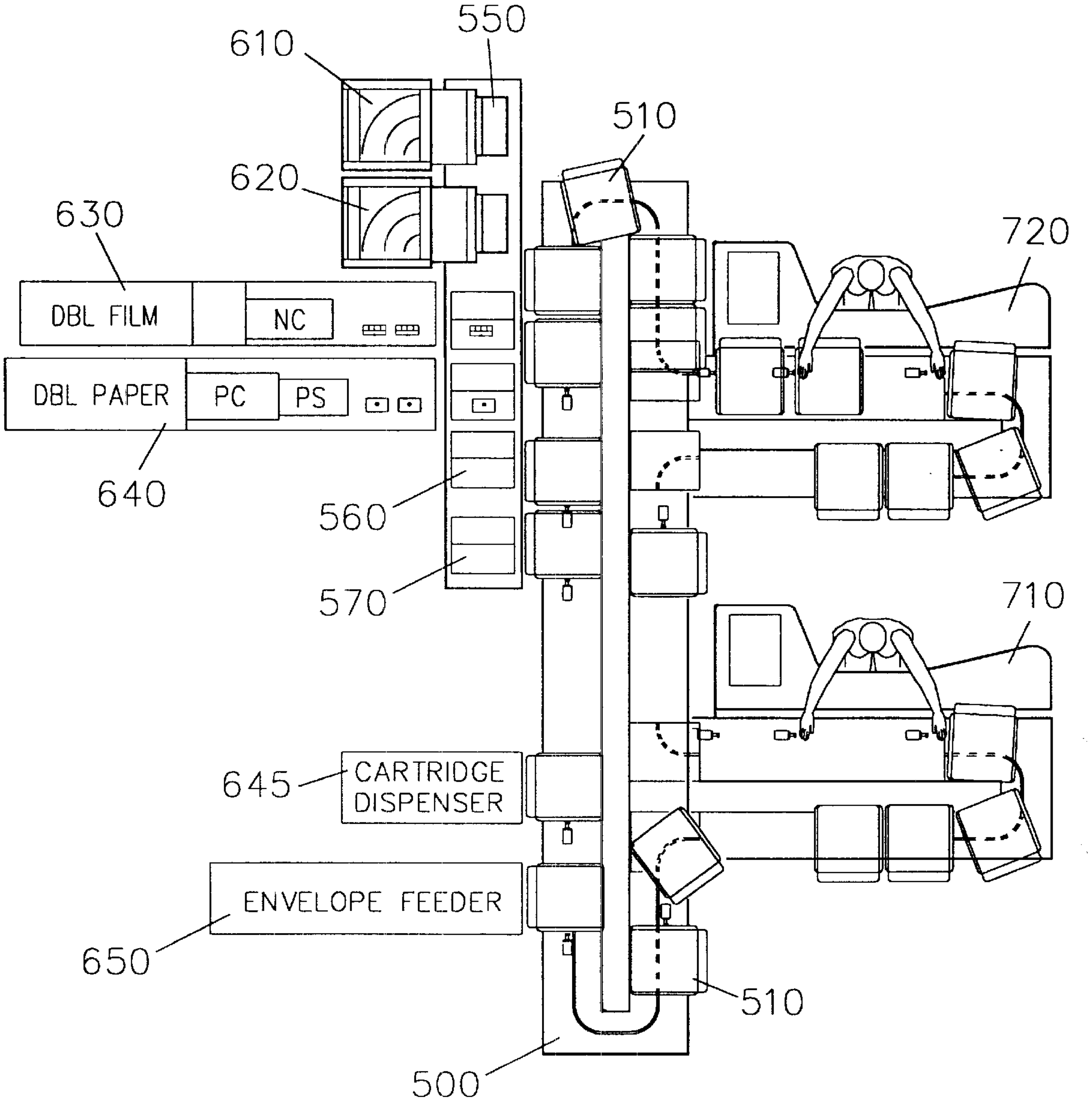
FIG. 4 is a further embodiment in a schematic elevation.

In FIG. 4, an embodiment with a higher level of automatisation is shown. An additional conveyer path 550 is arranged besides the conveyer 500. The devices 610 to 640 are preferably prepared to insert all items related to an automatically processable customer order into one type of wallet which is supplied by either the wallet feeder 610 or the wallet feeder 620. After all items belonging to one customer order are assigned to the corresponding wallet, a completed wallet 560 can be supplied to a customer order storage location 570 to be shipped, e.g. to a photo shop or the customer himself.

If a particular customer order cannot be processed or not completely processed via the additional conveyer path, the items can be handed over to the pallets 510 being transported to operators 710, 720 to be completed. Of course, also the operators 710, 720 can have different levels of skills and the central lab computer can control the switches in front of the operators in accordance with the complexity information related to the pallets 510 and to the corresponding customer orders.

Figure 5:
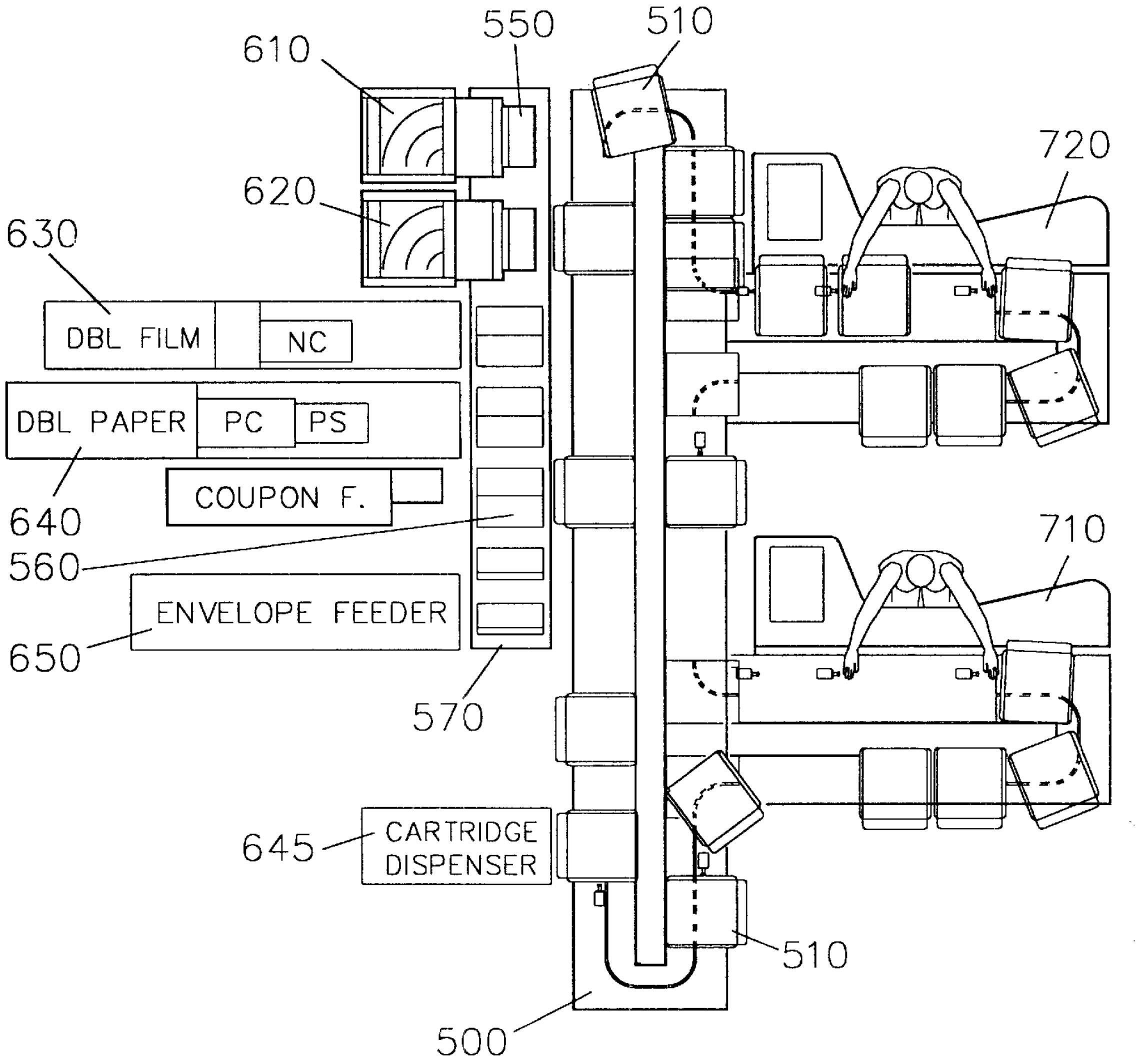
FIG. 5 shows another embodiment of the invention in a schematic overview.

The embodiment according to FIG. 5 has even a higher level of automatisation, in that more of the devices are located in the reach or scope of the additional conveyer path 550 so that additional operations can be covered automatically. In principal, however, also this embodiment works as mentioned above, in particular considering the embodiments of FIGS. 1, 2 and 4.

What is claimed is:

1. Method of processing photographs in a photographic laboratory by means of a photographic processing system, comprising the steps of:

receiving customer orders and processing information, respectively assigned to the customer orders, each order comprising at least one photographic image and processing information defining processing tasks;

storing at least one of processing skills and capabilities of a number of operators;

further comprising that a number of processing tasks are assigned to at least one processing site based on at least one of the stored processing skills and capabilities of the number of operators and based on which operator is available at the processing site or sites; and if processing information of said received customer orders, which is assigned to a related customer order, requires execution of at least one of said assigned processing tasks, the corresponding customer order is processed at the at least one assigned processing site for said execution.

2. Method according to claim 1, comprising the step of:

classifying the processing tasks to be performed into difficulty, skill and/or capability levels, a particular level being assigned to at least one of the processing sites, said at least one processing site being capable of performing a processing task of the same or lower difficulty level and wherein the customer order, on which a particular processing task is to be performed, is processed at or passed to said at least one processing site only if the particular processing task belongs to the same or lower difficulty level assigned to said at least one processing site.

3. Method according to claim 2, wherein if a number of processing sites of sufficient difficulty level are available, passing the processing unit to the processing site of a lowest difficulty, skill and/or capability level.

4. Method according to claim 1, comprising the step of monitoring which operator is at which processing site and amending the assignment of processing tasks in dependence from the operator available at said processing site.

5. Method according to claim 1, comprising the step of assigning at least one processing site to processing tasks so far unknown to the processing system.

6. Method according to one of claim 1, comprising the steps of:

additionally checking each processing information whether or not the processing information can automatically be processed by said processing system without assistance of an operator and identifying those customer or photographic orders which are to be processed according to a not automatically processable processing order and passing those photographic orders to the assigned processing sites.

7. Method according to claim 1, wherein in the case that processing information comprises instructions at least one of which is not automatically executable, comprising the step of:

checking each instruction for whether the instruction may be executed automatically by said processing system such that the assigned customer order may be automatically processed by the processing system without assistance of an operator and executing at least a part of those automatically executable instructions automatically by said processing system.

8. Method according to claim 1, wherein after at least partial, in particular automatic processing of the customer orders, the orders are checked for errors due to the processing and wherein those orders having errors are conveyed to a processing site assigned for handling the errors.

9. Method according to claim 1, wherein each customer order comprises a film unit of developed photographic film, and a print unit of prints made by printing said photographic pictures on photographic paper;

and wherein each processing information is assigned to a customer order comprising a film unit and a corresponding print unit, said corresponding print unit comprising a number of prints of photographic pictures included in the corresponding film unit.

10. Method according to claim 9, wherein said photographic film and/or said prints are received in the form of a web and wherein one of said plurality of processes performed by said processing system is cutting said web in sections, each section assigned to at least one photographic picture and the size or format of each section being defined by the information assigned to a related order.

11. Method according to claim 10, wherein one of said plurality of process performed by the process system is packing developed photographic film and prints into a package, wherein the selection of the film and the prints to be packed in the same package is defined by the assigned order.

12. Method according to claim 11, wherein one of said plurality of processes is adding supplements to said packages, wherein whether a supplement is to be added or not and the kind of supplement is defined by the information, e.g. processing instructions, assigned to the film and prints in said package.

13. Method according to claim 1, further comprising the step of:

assigning particular match codes to elements of said customer orders and support means, wherein each support means is a pallet for supporting said elements of each of said customer orders.

14. Processing system in a photographic laboratory in particular for performing the method according to claim 1 comprising:

receiving means for receiving the customer orders and processing information respectively assigned to the customer orders, each order comprising at least one photographic picture;

controlling means for controlling the processing of the customer orders in accordance with the assigned processing information;

further comprising memory means for storing assignments of processing tasks to processing sites, said assignments based on at least one of processing features available on said processing sites and the processing skills of the operator or operators available on the processing site or sites, wherein said controlling means further comprises:

checking means for checking the processing information for each processing order for processing tasks to be performed;

passing means for accessing said memory means and for passing the customer orders or elements of the customer orders to the processing sites assigned to the processing tasks to be performed;

a conveying means for conveying pallets along a conveying path;

supplying means for supplying elements belonging to one of the customer orders into a pallet such that the pallet is supplied only with elements of the one customer order, wherein said controlling means assigns to each pallet the processing information corresponding to the customer order to which the elements of the pallet belong; and said passing means controls said conveying means such that the pallets are conveyed to the processing sites for the processing tasks to be performed.

15. A program which, when running on a computer being part of a processing system in a photographic laboratory or when loaded in said computer brings about or is capable of bringing about that the computer carries out the method as claimed in claim 1.

16. A computer program product comprising the program claimed in claim 15.

17. A processing system in a photographic laboratory, comprising:

receiving means for receiving customer orders and processing information respectively assigned to the customer orders, each order comprising at least one photographic picture;

controlling means for controlling processing of the customer orders in accordance with the assigned processing information;

memory means for storing at least one of processing skills and capabilities of a number of operators and assignments of processing tasks to processing sites, said assignments based on at least one of the stored processing skills and capabilities of the number of operators, wherein said controlling means further comprises:

checking means for checking the processing information for each processing order for processing tasks to be performed;

passing means for accessing said memory means and for passing the customer orders or elements of the customer orders to the processing sites assigned to the processing tasks to be performed;

conveying means for conveying pallets along a conveying path;

supplying means for supplying elements belonging to one of the customer orders into a pallet such that the pallet is supplied only with elements of the one customer order;

wherein said controlling means assigns to each pallet the processing information corresponding to the customer order to which the elements of the pallet belong; and said passing means controls said conveying means such that the pallets are conveyed to the processing sites for the processing tasks to be performed.

* * * * *